(12) United States Patent  
Yoon

(10) Patent No.: US 8,263,249 B2  
(45) Date of Patent: Sep. 11, 2012

(54) FOLDABLE BATTERY CARTRIDGE AND MIDDLE OR LARGE-SIZED BATTERY MODULE

(75) Inventor: Junill Yoon, Seoul (KR)

(73) Assignee: LG Chem, Ltd. (KR)

( * ) Notice: Subject to any disclaimer, the term of this patent is extended or adjusted under 35 U.S.C. 154(b) by 1359 days.

(21) Appl. No.: 11/490,730

(22) Filed: Jul. 21, 2006

(65) Prior Publication Data  
US 2007/0020516 A1  Jan. 25, 2007

(30) Foreign Application Priority Data  
Jul. 21, 2005 (KR) .................. 10-2005-0066084

(51) Int. Cl.  
H01M 2/10 (2006.01)  
H01M 2/02 (2006.01)  
H01M 2/00 (2006.01)

(52) U.S. Cl. .......... 429/99; 429/100; 429/152; 429/153; 429/149

(58) Field of Classification Search .................. 429/96, 429/97, 99, 100, 149, 152, 153, 158, 159, 429/163, 176, 186  
See application file for complete search history.

(56) References Cited

U.S. PATENT DOCUMENTS

| | | | | |
|---|---|---|---|---|
| 5,415,947 | A | * | 5/1995 | Mitsui et al. ............... 429/99 |
| 5,853,915 | A | * | 12/1998 | Suto ............................ 429/99 |
| 6,218,043 | B1 | * | 4/2001 | Leung et al. ................ 429/99 |
| 6,905,790 | B2 | | 6/2005 | Benson et al. |
| 2001/0026886 | A1 | * | 10/2001 | Inui et al. .................. 429/120 |
| 2005/0100783 | A1 | | 5/2005 | Ro et al. |
| 2005/0140338 | A1 | | 6/2005 | Kim et al. |

FOREIGN PATENT DOCUMENTS

| | | |
|---|---|---|
| CN | 1319916 | 10/2001 |
| EP | 1475853 | 11/2004 |
| JP | 07183014 | 7/1995 |
| JP | 08055615 | 2/1996 |
| JP | 10050280 | 2/1998 |
| JP | 11067172 | 3/1999 |
| JP | 2001283937 | 10/2001 |
| JP | 2005116407 | 4/2005 |

* cited by examiner

Primary Examiner — Barbara Gilliam  
Assistant Examiner — Edu E Enin-Okut  
(74) Attorney, Agent, or Firm — Cantor Colburn LLP

(57) ABSTRACT

Disclosed herein is a battery cartridge having two or more unit cells mounted therein, wherein the battery cartridge includes a rotation part, which is formed at a cartridge case constructed generally with a plate-shaped structure, in the longitudinal direction of the battery cartridge and/or in the lateral direction of the battery cartridge, such that the battery cartridge can be folded by a predetermined angle in the longitudinal direction of the battery cartridge and/or in the lateral direction of the battery cartridge. The battery cartridge can be folded by a predetermined angle through the provision of the rotation part, and therefore, the battery cartridge is constructed in various structures as compared to the conventional rigid battery cartridge.

20 Claims, 3 Drawing Sheets

400

FOLDABLE BATTERY CARTRIDGE AND MIDDLE OR LARGE-SIZED BATTERY MODULE

FIELD OF THE INVENTION

The present invention relates to a foldable battery cartridge and a middle- or large-sized battery module including the same, and, more particularly, to a battery cartridge having two or more unit cells mounted therein, wherein the battery cartridge includes a rotation part, such as a hinge, which is formed at a cartridge case constructed generally with a plate-shaped structure, in the longitudinal direction of the battery cartridge and/or in the lateral direction of the battery cartridge, such that the battery cartridge can be folded by a predetermined angle in the longitudinal direction of the battery cartridge and/or in the lateral direction of the battery cartridge, and a middle- or large-sized battery module or battery pack including the same.

BACKGROUND OF THE INVENTION

In recent years, as concern about environmental pollution has increased, a secondary battery, which can be charged and discharged, has attracted considerable attention as a power source for vehicles in order to solve problems caused by existing gasoline and diesel vehicles using fossil fuel. As a result, electric vehicles (EV), which are operated only using a battery, and hybrid electric vehicles (HEV), which use jointly a battery and a conventional engine. Some of the electric vehicles and the hybrid electric vehicles have been commercially used. A nickel-metal hydride (Ni—MH) secondary battery has been mainly used as the power source for the electric vehicles (EV) and the hybrid electric vehicles (HEV). In recent years, however, the use of a lithium-ion secondary battery, which has high energy density and high discharge voltage, as the power source for the electric vehicles and the hybrid electric vehicles has been attempted. High output and large capacity are needed for such a secondary battery to be used as the power source for the electric vehicles (EV) and the hybrid electric vehicles (HEV). For this reason, a plurality of small-sized secondary batteries (unit cells) are connected in series with each other so as to construct a middle- or large-sized battery pack.

Plate-shaped cells, which can be stacked with high integration, are preferably used as the unit cells. The plate-shaped cells are mounted in additional battery cartridges, in order that low mechanical strength of the plate-shaped cells are compensated for, and the electrical connection and stacking of the plate-shaped cells are easily accomplished, whereby a middle- or large-sized battery module or battery pack is constructed.

The battery cartridges are formed in the shape of a hexahedron having a large width and length to thickness ratio (generally in the shape of a plate). The battery cartridges are constructed in a structure in which one or more unit cells are mounted in rigid cartridge cases. Consequently, the battery cartridges are successively stacked one on another, and are then electrically connected with each other, whereby a middle- or large-sized battery module or battery pack is manufactured.

The middle- or large-sized battery module or battery pack is widely used as a power source for large-sized devices, such as electric vehicles and hybrid electric vehicles. However, the inner spaces of the respective devices, in which the middle- or large-sized battery module or battery pack is mounted, are restricted. Also, as the devices have had various sizes and shapes, the devices may have a structure in which the battery module or the battery pack cannot be easily mounted in the inner spaces of the devices.

On the other hand, the change in shape of a conventional battery cartridge, which constitutes a middle- or large-sized battery module or battery pack, is not possible because of the rigid structure of the conventional battery cartridge. As a result, the conventional battery cartridge is not adaptable to the change in structure of the inner space of the corresponding device. Consequently, it is necessary to manufacture various battery modules or battery packs depending upon the structures of the inner spaces of the devices, and therefore, a large number of corrections, such as design change, are required during the manufacturing process, which is not preferable.

SUMMARY OF THE INVENTION

Therefore, the present invention has been made to solve the above-mentioned problems, and other technical problems that have yet to be resolved.

Specifically, it is an object of the present invention to provide a battery cartridge foldable such that a battery module or a battery pack including the battery cartridge can be manufactured in various structures.

It is another object of the present invention to provide a battery module or a battery pack, the shape of which can be changed by using the above-described battery cartridge.

In accordance with one aspect of the present invention, the above and other objects can be accomplished by the provision of a battery cartridge having two or more unit cells mounted therein, wherein the battery cartridge includes at least one rotation part, which is formed at a cartridge case constructed generally with a plate-shaped structure, in the longitudinal direction of the battery cartridge and/or in the lateral direction of the battery cartridge, such that the battery cartridge can be folded by a predetermined angle in the longitudinal direction of the battery cartridge and/or in the lateral direction of the battery cartridge.

Herein, the longitudinal direction of the battery cartridge means a direction in which connection terminals of the battery cartridge extend, and the lateral direction of the battery cartridge means a direction perpendicular to the direction in which the connection terminals of the battery cartridge extend.

Consequently, the battery cartridge according to the present invention can be folded by a predetermined angle due to the rotation part formed in the longitudinal direction and/or the lateral direction of the battery cartridge, and therefore, the battery cartridge according to the present invention can be constructed in various structures as compared to the conventional rigid battery cartridge.

In a preferred embodiment, one rotation part is formed in the longitudinal direction of the battery cartridge or in the lateral direction of the battery cartridge. According to circumstances, however, two or more rotation parts may be formed in the same direction of the battery cartridge. Furthermore, the rotation part may have various structures. For example, the rotation part may be constructed with a hinge structure or with a flexible bus bar structure. The rotation part includes a conductive region, which allows the electrical connection between the unit cells mounted in the battery cartridge. In the case that the rotation part is constructed with the hinge structure, the hinge rotation part itself is made of a conductive member or at least a portion of the hinge rotation part includes a conductive member. In the case that the rotation part is constructed with the flexible bus bar structure, on the other hand, the bus bar rotation part itself serves as an electrically connecting member.

The variable angle of the rotation part may be changed within ±180 degrees depending upon the structure of the rotation part. When the rotation part is varied by 180 degrees or by −180 degrees, the battery cartridge is fully folded, and therefore, the length of the folded battery cartridge is reduced to half of the length of the unfolded battery cartridge.

The cartridge case may comprise a variety of structures and materials. For example, the cartridge case may be constructed with an open-type frame structure or a close-type box structure, and the cartridge case may be made of a metal material or an insulating material, such as plastic resin. In the case that the cartridge case is made of the metal material, it is preferable that the cartridge case be constructed in a laminate structure in which the outer surface of the cartridge case is coated with an insulating material or an insulating layer is attached to the outer surface of the cartridge case.

The cartridge case is provided at the outer surface thereof with connection terminals, which are electrically connected to electrode terminals of the unit cells.

In a preferred embodiment, the cartridge case is further provided at the outer surface thereof with detection parts for detecting voltages and temperatures of the unit cells mounted in the cartridge case. The detection parts may be formed or may not be formed at the same side of the cartridge case.

One or more unit cells may be mounted in right-side and left-side members of the battery cartridge, which are divided from each other about the rotation part. The unit cells are not particularly restricted so long as the unit cells are formed in the shape of a plate.

Preferably, the electrode terminals of the unit cells are formed at the outsides of the battery cells such that the electrode terminals are opposite to each other or perpendicular to each other about the unit cells. Consequently, while the unit cells are mounted in the cartridge case, one electrode terminal (a cathode) of each of the unit cells is directly connected to the corresponding connection terminal of the battery cartridge, and the other electrode terminal (an anode) of each of the unit cells is directly connected to the rotation part. When two or more unit cells are mounted together in any one of the side members of the battery cartridge about the rotation part, the final electrode terminals are connected to the rotation part and the connection terminals of the battery cartridge, as described above, while the unit cells are connected in series or parallel with each other.

In a preferred embodiment, the rotation part is formed at the middle of the battery cartridge in the lateral direction of the cartridge case such that the battery cartridge can be folded in the longitudinal direction of the cartridge case, the unit cells, the electrode terminals of which are formed at the upper and lower ends of the battery cells while the electrode terminals of the unit cells are opposite to each other, are mounted in the battery cartridge such that one electrode terminal of each of the unit cells is directly connected to the rotation part, and the other electrode terminal of each of the unit cells is directly connected to the corresponding connection terminal of the battery cartridge, and the connection terminals of the battery cartridge are formed at the upper and lower ends of the cartridge case, which are opposite to the rotation part.

However, the above-described structure is only an illustrative example, and therefore, it is possible to provide other various structures.

In accordance with another aspect of the present invention, there is provided a middle- or large-sized battery module including two or more battery cartridges having the above-described structure.

The battery cartridges can be folded by the corresponding rotation parts, and therefore, the battery module may have various structures. For example, the battery module may be constructed: (1) in a structure in which the two or more battery cartridges are successively stacked one on another while the respective two or more battery cartridges are unfolded; (2) in a structure in which the two or more battery cartridges are successively stacked one on another after the respective two or more battery cartridges are folded by 180 degrees; (3) in a structure in which the two or more battery cartridges are connected with each other in the side directions of the two or more battery cartridges while the two or more battery cartridges are folded and/or unfolded; or (4) in a structure in which the two or more battery cartridges are stacked one on another or connected with each other in the side directions of the two or more battery cartridges while some of the two or more battery cartridges are folded and the other of the two or more battery cartridges are unfolded.

The battery module according to the present invention may be changed in shape in response to the restricted inner space of a device, in which the battery modules are mounted, and may be then mounted in the restricted inner space of a device, because of the foldability of the battery cartridges, which constitute the battery module. For example, in the case that the inner space of the device is narrow and long, but is not straight, some of the battery cartridges are folded by a predetermined angle, and are then connected with each other in the side directions of the battery cartridges, whereby the battery module is constructed. In the case that the inner space of the device has a small sectional area and a large length, on the other hand, the battery cartridges are fully folded as in the above-described structure (2), such that the sectional area of the battery cartridges is reduced, and are then stacked one on another in the longitudinal direction of the battery module, whereby the battery module is constructed.

The above-mentioned variability is one of the striking characteristics of the battery module according to the present invention.

Herein, the "battery pack" means a complete structure in which electrically connecting units and an operation control unit are mounted in the battery module. Also, the "battery pack" means a middle- or large-sized battery system comprising a plurality of battery modules. Consequently, the battery module and the battery pack are not interpreted to have different meanings.

Preferably, the battery module or the battery pack according to the present invention is used as a power source for electric vehicles (EV), hybrid electric vehicles (HEV), electric motorcycles, and electric bicycles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
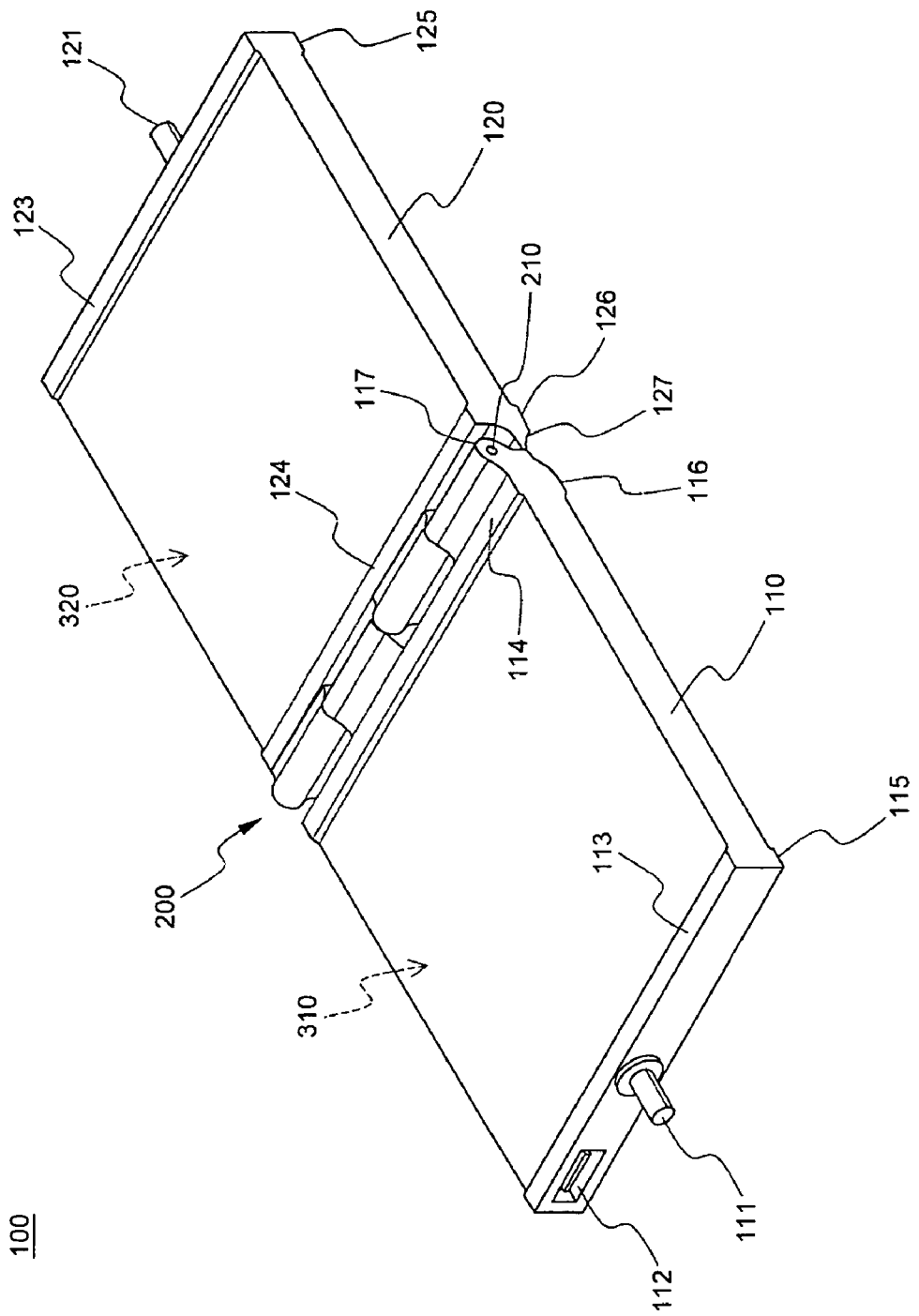
FIG. 1 is a typical view illustrating a battery cartridge according to a preferred embodiment of the present invention.

FIG. 1 is a typical view illustrating a battery cartridge according to a preferred embodiment of the present invention.

Referring to FIG. 1, the battery cartridge 100 comprises two plate-shaped members 110 and 120, which are connected with each other such that the plate-shaped members 110 and 120 can be hingedly rotated by a hinge rotation part 200. In the respective plate-shaped members 110 and 120 are mounted unit cells 310 and 320, respectively. For convenience of description, the plate-shaped members 110 and 120 are shown in a seal-type structure.

From the upper ends of the plate-shaped members 110 and 120 protrude connection terminals 111 and 121, respectively. The connection terminals 111 and 121 are connected to electrode terminals (not shown) of the unit cells 310 and 320 mounted in the plate-shaped members 110 and 120, respectively.

For example, a cathode terminal of the unit cell 310 mounted in the first plate-shaped member 110 is connected to the connection terminal 111, and an anode terminal of the unit cell 310 mounted in the first plate-shaped member 110 is connected to a conductive member of the hinge rotation part 200. Similarly, an anode terminal of the unit cell 320 mounted in the second plate-shaped member 120 is connected to the connection terminal 121, and a cathode terminal of the unit cell 320 mounted in the second plate-shaped member 120 is connected to the conductive member of the hinge rotation part 200. In the above-described structure, the unit cells 310 and 320 are connected in series with each other. For easy electrical connection, the electrode terminals of the unit cells 310 and 320 protrude from the upper and lower ends of the battery cells while the electrode terminals of the unit cells 310 and 320 are opposite to each other. Also, in the case that two or more unit cells are mounted in each of the plate-shaped members 110 and 120, the final electrode terminals are connected to the connection terminals and the conductive member of the hinge rotation part 200 while the unit cells are electrically connected with each other.

At the upper ends of the plate-shaped members 110 and 120 are formed detection parts 112 and 122 for detecting voltages and temperatures of the corresponding unit cells. The detection parts 112 and 122 may be located at the side parts of the plate-shaped members 110 and 120 such that the positional overlapping between the detection parts 112 and 122 and the connection terminals 111 and 121 is prevented.

Figure 2:
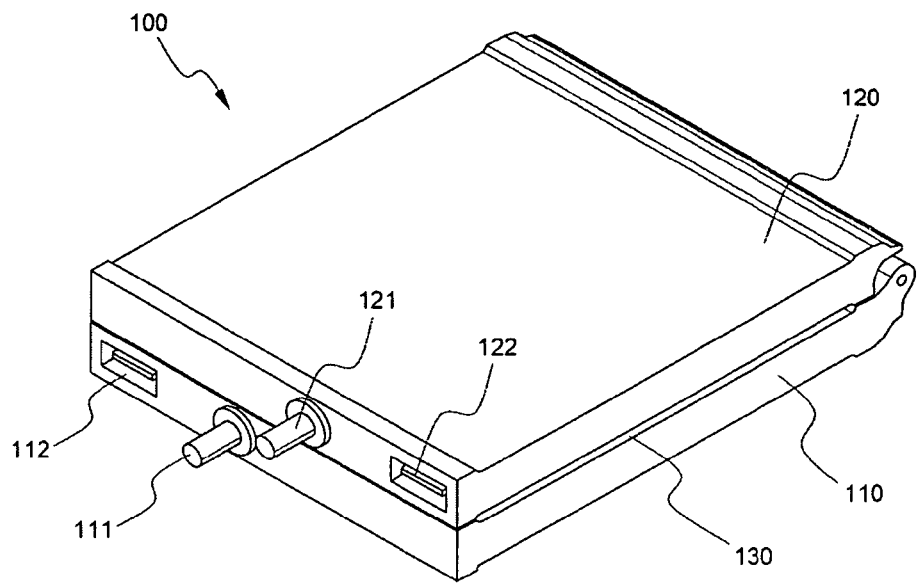
FIG. 2 is a typical view illustrating the fully folded state of the battery cartridge shown in FIG. 1.
Figure 3:
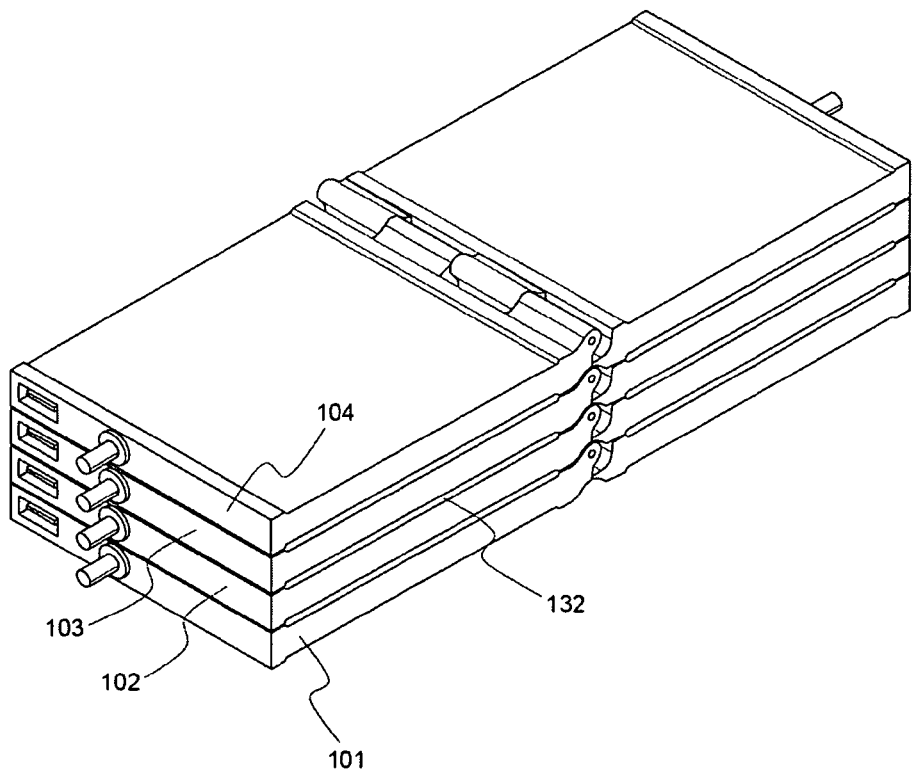
FIG. 3 is a typical view illustrating a battery module according to a preferred embodiment of the present invention, which is constructed using a plurality of battery cartridges, one of which is shown in FIG. 1.
Figure 4:
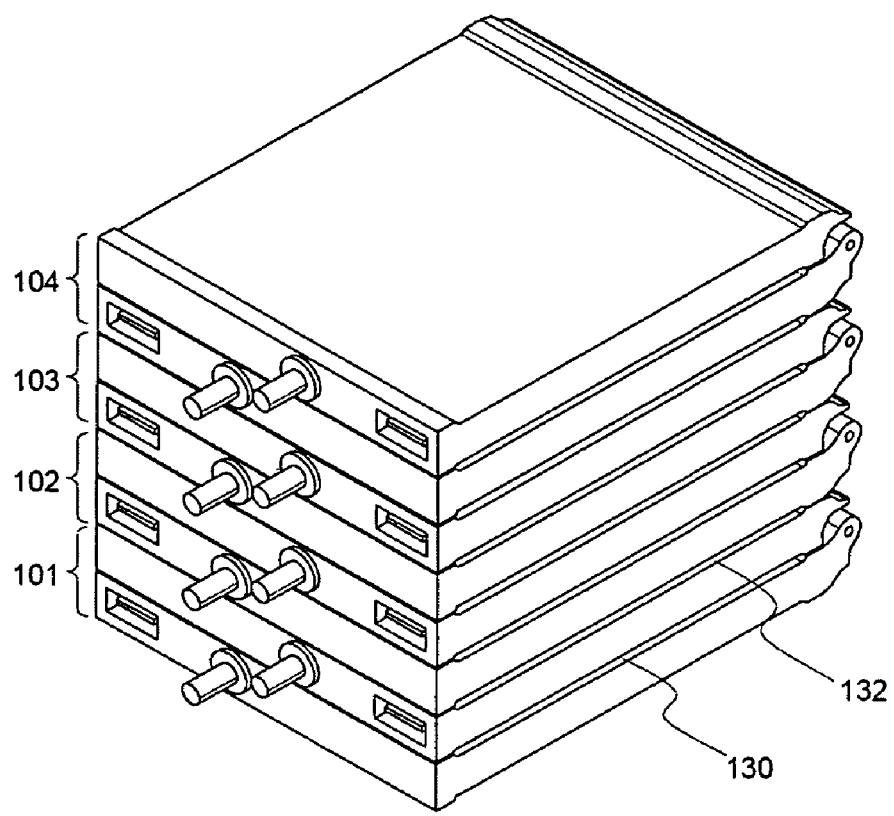
FIG. 4 is a typical view illustrating a battery module according to another preferred embodiment of the present invention, which is constructed using a plurality of battery cartridges, one of which is shown in FIG. 1.

The upper and lower ends 113, 114, 123, and 124 of the inside surfaces of the plate-shaped members 110 and 120 protrude from the plate-shaped members 110 and 120, respectively. Consequently, when the battery cartridge 100 is fully folded as shown in FIG. 2, the middle parts of the inside surfaces of the plate-shaped members 110 and 120 are spaced apart from each other. Similarly, the upper and lower ends 115, 116, 125, and 126 of the outside surfaces of the plate-shaped members 110 and 120 protrude from the plate-shaped members 110 and 120, respectively. Consequently, when the plate-shaped members 110 and 120 are stacked on other plate-shaped members as shown in FIG. 3 or 4, the middle parts of the outside surfaces of the plate-shaped members 110 and 120 are spaced apart from the middle parts of the inside surfaces of the other plate-shaped members or from the middle parts of the outside surfaces of the other plate-shaped members. The above-mentioned "inside surface" and the above-mentioned "outside surface" mean the inner surface and the outer surface of the battery cartridge 110 when the battery cartridge 110 is folded as shown in FIG. 2.

Gaps 130 and 132, which are defined between the middle parts of the inside surfaces of the plate-shaped members 110 and 120 of the fully folded battery cartridge 100 and between the middle parts of the outside surfaces of the plate-shaped members 110 and 120 and the middle parts of the corresponding inside surfaces of the neighboring plate-shaped members or the corresponding outside surfaces of the neighboring plate-shaped members, are used as channels for refrigerant, such as air, by which heat generated from the unit cells during the charge and discharge of the unit cells is effectively removed.

Referring back to FIG. 1, the lower end 117 of the first plate-shaped member 110, which constitutes the hinge rotation part 200, is constructed in a protrusion structure, and the lower end 127 of the second plate-shaped member 120, which corresponds to the lower end 117 of the first plate-shaped member 110, is constructed in a depression structure. Consequently, when battery cartridges are stacked one on another while the respective battery cartridges are fully folded as shown in FIG. 4, the adjacent battery cartridges are not prevented from being stacked one on another.

The hinge rotation part 200 itself or a connection shaft 210 of the hinge rotation part 200 is made of a conductive member, and the hinge rotation part 200 or the connection shaft 210 of the hinge rotation part 200 are connected to the electrode terminals of the unit cells mounted in the respective plate-shaped members 110 and 120, whereby the electrical connection between the first plate-shaped member 110 and the second plate-shaped member 120 is accomplished.

Due to the hinge rotation part 200, the first plate-shaped member 110 and the second plate-shaped member 120 can be rotated by a predetermined angle with respect to each other.

FIG. 2 is a typical view illustrating the fully folded state of the battery cartridge shown in FIG. 1.

Referring to FIG. 2, the first plate-shaped member 110 and the second plate-shaped member 120 are brought into contact with each other, whereby the length of the folded battery cartridge 100 is reduced to half of the length of the unfolded battery cartridge 100. However, it is also possible that the first plate-shaped member 110 and the second plate-shaped member 120 are rotated by different angles with respect to each other.

When the battery cartridge is folded, the connection terminals 111 and 121 and the detection parts 112 and 122 are not located on the same axis. The electrical connection between the connection terminals 111 and 121 and the connection between the detection parts 112 and 122 are easily accomplished through the above-mentioned structure.

As previously described, the gap 130 is defined between the middle parts of the inside surfaces of the plate-shaped members 110 and 120 when the battery cartridge 100 is fully folded, and the heat dissipation from the unit cells mounted in the battery cartridge 100 is effectively accomplished due to the gap 130.

FIG. 3 is a typical view illustrating a battery module according to a preferred embodiment of the present invention, which is constructed using a plurality of battery cartridges, one of which is shown in FIG. 1.

Referring to FIG. 3, the battery module 300 is constructed in a structure in which a plurality of battery cartridges 101, 102, 103, and 104 are successively stacked one on another while the respective battery cartridges 101, 102, 103, and 104 are fully unfolded as shown in FIG. 1. This structure of the battery module 300 is substantially identical to the structure of a module constructed by stacking conventional rigid plate-shaped battery cartridges.

As previously described, the gaps 132 are defined between the middle parts of the inner surfaces of the stacked battery cartridges 101, 102, 103, and 104 and the middle parts of the corresponding outer surfaces of the adjacent battery cartridges, whereby the heat dissipation from the unit cells mounted in the battery cartridges 101, 102, 103, and 104 is effectively accomplished due to the gap 132.

FIG. 4 is a typical view illustrating a battery module according to another preferred embodiment of the present invention, which is constructed using a plurality of battery cartridges, one of which is shown in FIG. 1.

Referring to FIG. 4, the battery module 400 is constructed in a structure in which a plurality of battery cartridges 101, 102, 103, and 104 are successively stacked one on another while the respective battery cartridges 101, 102, 103, and 104 are fully folded as shown in FIG. 2. The battery module 400 of FIG. 4 has a width less than that of the battery module 300 of FIG. 3 but a height greater than that of the battery module 300 of FIG. 3.

As previously described, the gaps 132 are defined between the middle parts of the outer surfaces of the stacked battery cartridges 101, 102, 103, and 104 and the middle parts of the corresponding outer surfaces of the adjacent battery cartridges, whereby the heat dissipation from the unit cells mounted in the battery cartridges 101, 102, 103, and 104 is effectively accomplished due to the gap 132.

The battery modules 300 and 400 of FIGS. 3 and 4 represent the typical construction of the module using the battery cartridge 100 of FIG. 1, although the battery module may be constructed in various manners.

INDUSTRIAL APPLICABILITY

As apparent from the above description, the battery cartridge includes the rotation part, by which the battery cartridge can be folded by a predetermined angle, and therefore, the battery cartridge is constructed in various structures as compared to the conventional rigid battery cartridge. Also, the battery module including the above-mentioned battery cartridge can be actively constructed such that the shape of the battery module can be changed depending upon the inner space of a device in which the battery module is mounted. Consequently, it is not necessary to manufacture additional battery cartridges or additional battery modules depending upon the shape of the inner space of the device, and therefore, costs caused due to the design change of the battery cartridge or the battery module are considerably reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is :

1. A battery cartridge having at least two unit cells disposed therein, the battery cartridge comprising:
    a plurality of plate-shaped members;
    at least one rotation part connected to at least two of the plurality of plate-shaped members and disposed in a longitudinal direction of the battery cartridge or in a lateral direction of the battery cartridge, such that the battery cartridge is configured to be folded by a predetermined angle in the longitudinal direction of the battery cartridge or in the lateral direction of the battery cartridge,
    wherein an edge portion of each of inside surfaces and outside surfaces of the plurality of plate-shaped members protrudes in a direction substantially normal to the each of the inside surfaces and outside surfaces of the plurality of plate-shaped members,
    wherein middle portions of inside surfaces of the plurality of plate-shaped members are spaced apart from each other in a configuration wherein the battery cartridge is fully folded,
    wherein an inside portion of the at least one rotation part is protruded with respect to inside surfaces of the at least two of the plurality of plate-shaped members connected thereto and an outside portion of the at least one rotation part is depressed with respect to outside surfaces of the at least two of the plurality of plate-shaped members connected thereto when the battery cartridge is fully unfolded, and
    wherein the protruded inside portion and the depressed outside portion of the at least one rotation part correspond to each other such that battery cartridges are allowed to be stacked one on another when the battery cartridges are fully unfolded.

2. The battery cartridge according to claim 1, wherein the at least one rotation part includes one or more rotation parts formed in the longitudinal direction of the battery cartridge or in the lateral direction of the battery cartridge.

3. The battery cartridge according to claim 1, wherein the rotation part is constructed with a hinge structure or with a flexible bus bar structure.

4. The battery cartridge according to claim 1, wherein the rotation part itself is made of a conductive member or at least a portion of the rotation part includes the conductive member, whereby the electrical connection between the at least two or more unit cells disposed in the cartridge is accomplished.

5. The battery cartridge according to claim 1, wherein the cartridge case is constructed with an open-type frame structure or a close-type box structure.

6. The battery cartridge according to claim 1, wherein the cartridge case is provided at the outer surface thereof with connection terminals, which are electrically connected to electrode terminals of the at least two unit cells, and detection parts for detecting voltages and temperatures of the at least two unit cells.

7. The battery cartridge according to claim 6, wherein the connection terminals and the detection parts formed at right-side or left-side members of the battery cartridge, which are divided from each other about the rotation part, are not located on the same axis.

8. The battery cartridge according to claim 1, wherein the electrode terminals of the at least two unit cells are formed at the outsides of the battery cells such that the electrode terminals are opposite to each other or perpendicular to each other about the at least two unit cells, whereby, while the at least two unit cells are disposed in the cartridge case, one electrode terminal of each of the at least two unit cells is directly connected to the corresponding connection terminal of the battery cartridge, and the other electrode terminal of each of the at least two unit cells is directly connected to the rotation part.

9. The battery cartridge according to claim 1, wherein
the rotation part is formed at the middle of the battery cartridge in the lateral direction of the cartridge case such that the battery cartridge can be folded in the longitudinal direction of the cartridge case,
the at least two unit cells, the electrode terminals of which are formed at the upper and lower ends of the battery cells while the electrode terminals of the at least two unit cells are opposite to each other, are disposed in the battery cartridge such that one electrode terminal of each of the at least two unit cells is directly connected to the rotation part, and the other electrode terminal of each of the at least two unit cells is directly connected to the corresponding connection terminal of the battery cartridge, and
the connection terminals of the battery cartridge are formed at the upper and lower ends of the cartridge case, which are opposite to the rotation part.

10. A middle- or large-sized battery module including two or more battery cartridges according to claim 1.

11. The battery module according to claim 10, wherein the battery module is constructed:
   (1) in a structure in which the two or more battery cartridges are successively stacked one on another while the respective battery cartridges are unfolded;
   (2) in a structure in which the two or more battery cartridges are successively stacked one on another after the respective battery cartridges are folded by 180 degrees;
   (3) in a structure in which the two or more battery cartridges are connected with each other in the side directions of the battery cartridges while the battery cartridges are folded and/or unfolded; or
   (4) in a structure in which the two or more battery cartridges are stacked one on another or connected with each other in the side directions of the battery cartridges while some of the battery cartridges are folded and the other of the battery cartridges are unfolded.

12. The battery module according to claim 10, wherein the battery module is used as a power source for electric vehicles (EV), hybrid electric vehicles (HEV), electric motorcycles, and electric bicycles.

13. A middle- or large-sized battery module including two or more battery cartridges according to claim 2.

14. A middle- or large-sized battery module including two or more battery cartridges according to claim 3.

15. A middle- or large-sized battery module including two or more battery cartridges according to claim 4.

16. A middle- or large-sized battery module including two or more battery cartridges according to claim 5.

17. A middle- or large-sized battery module including two or more battery cartridges according to claim 6.

18. A middle- or large-sized battery module including two or more battery cartridges according to claim 7.

19. A middle- or large-sized battery module including two or more battery cartridges according to claim 8.

20. A middle- or large-sized battery module including two or more battery cartridges according to claim 9.

* * * * *